(12) United States Patent
Rees et al.

(10) Patent No.: US 11,840,801 B2
(45) Date of Patent: Dec. 12, 2023

(54) TEXTILES WITH IMPROVED SURFACE STABILITY

(71) Applicant: ENGINEERED FLOORS LLC, Dalton, GA (US)

(72) Inventors: John Joseph Matthews Rees, Chattanooga, TN (US); Anthony Daniell, Dalton, GA (US); Stephen Horace Tsiarkezos, Elkton, MD (US)

(73) Assignee: ENGINEERED FLOORS LLC, Dalton, GA (US)

( * ) Notice: Subject to any disclaimer, the term of this patent is extended or adjusted under 35 U.S.C. 154(b) by 379 days.

(21) Appl. No.: 17/091,488

(22) Filed: Nov. 6, 2020

(65) Prior Publication Data

US 2021/0140098 A1 May 13, 2021

Related U.S. Application Data

(60) Provisional application No. 62/931,968, filed on Nov. 7, 2019.

(51) Int. Cl.
*B32B 38/08* (2006.01)
*D06M 23/14* (2006.01)
(Continued)

(52) U.S. Cl.
CPC ........... *D06M 15/507* (2013.01); *B32B 37/15* (2013.01); *B32B 38/08* (2013.01); *D06M 15/564* (2013.01);
(Continued)

(58) Field of Classification Search
CPC ........ D06N 7/00; D06N 7/068; D06N 7/0094; D06N 7/0028; D06N 7/0031;
(Continued)

(56) References Cited

U.S. PATENT DOCUMENTS 3,313,645 A 4/1967 Wagner et al.
4,689,256 A * 8/1987 Slosberg .............. D06N 3/0063
428/95

(Continued)

FOREIGN PATENT DOCUMENTS

CN 1183743 A * 6/1998 ............. B29C 70/24
JP 2001517112 A * 10/2001 ............... B32B 5/26
WO WO-2008124449 A2 * 10/2008 ........... B32B 27/065

OTHER PUBLICATIONS

Aimee; "Interfacing? Stabilizers? Huh?"; Andrie Designs, [retrieved from internet at https://www.andriedesigns.com/interfacing-stabilizers-huh/] Jun. 18, 2019; 18 pages.
(Continued)

*Primary Examiner* — Jennifer A Steele
(74) *Attorney, Agent, or Firm* — PATENT PORTFOLIO BUILDERS PLLC (57) ABSTRACT

Resin dissolved or suspended in liquid is applied to a greige fabric formed with finer denier yarns forming surface loops before the fabric is bulked and after the liquid has been removed by low-temperature drying. The dried fabric is then bulked at a higher temperature setting the resin, resulting in superior loop tip resilience, and superior surface durability. Bulking and simultaneous resin setting optionally includes shrinking in area by 10-20%. Print appearance retention is also superior when printing follows bulking and setting of the resin.

31 Claims, 3 Drawing Sheets

(51) Int. Cl.
*D06N 7/00* (2006.01)
*B32B 37/15* (2006.01)
*D06M 15/507* (2006.01)
*D06M 15/564* (2006.01)
*D06M 15/71* (2006.01)
*D06M 101/32* (2006.01)
*D06M 15/263* (2006.01)

(52) U.S. Cl.
CPC ............ *D06M 15/71* (2013.01); *D06M 23/14* (2013.01); *D06N 7/0071* (2013.01); *B32B 2309/025* (2013.01); *B32B 2309/68* (2013.01); *D06M 15/263* (2013.01); *D06M 2101/32* (2013.01)

(58) Field of Classification Search
CPC . D06N 7/0034; D06N 7/0005; D06M 15/507; D06M 15/564; D06M 15/71; D06M 15/263; D06M 2101/32; B32B 2309/025; D10B 2403/00
USPC ............................... 427/372.2, 342; 156/311
See application file for complete search history.

(56) References Cited

U.S. PATENT DOCUMENTS

| | | | |
|---|---|---|---|
| 5,692,936 A | 12/1997 | Yamaguchi et al. | |
| 5,707,710 A * | 1/1998 | Zafiroglu | B32B 5/06 428/218 |
| 6,344,254 B1 * | 2/2002 | Smith | D06N 7/0081 428/95 |
| 2004/0191470 A1 * | 9/2004 | Zafiroglu | D04H 11/08 442/403 |
| 2013/0273297 A1 * | 10/2013 | Zafiroglu | D04B 21/02 428/221 |
| 2015/0017376 A1 * | 1/2015 | Smith | B32B 38/0004 428/44 |
| 2016/0333517 A1 | 11/2016 | Zhang et al. | |

OTHER PUBLICATIONS

Souder, T.; "Color Science: Dyeing vs. Printing" by Grennhouse Fabrics; [retrieved from the internet on Jan. 4, 2021 at https://www.greenhousefabrics.com/blog/color-science-dyeing-vs-printing] Mar. 14, 2019; 8 pages.

International Search Report and Written Opinion in corresponding/related International Application No. PCT/US20/59396 dated Mar. 1, 2021.

Fibre2fashion.com; "Radio Frequency (RF) Dryer in Textile Industries"; New Cloth Market; [retrieved from the Internet on Jan. 4, 2021 at https://www.fibre2fashion.com/industry-article/7354/radio-frequency-rf-dryer-in-textile-industries]; Jun. 2014; 4 pages.

* cited by examiner

FIG. 5

TEXTILES WITH IMPROVED SURFACE STABILITY

CROSS-REFERENCE TO RELATED APPLICATIONS

The present invention claims priority to U.S. Provisional Patent Application No. 62/931,968 filed Nov. 7, 2019. The entire contents of which are incorporated herein by reference.

TECHNICAL FIELD

Embodiments of the subject matter disclosed herein relate bulked textile fabrics and composites, including floorcoverings with looped yarn surfaces.

BACKGROUND

Textile floor coverings with yarn loops on the surface are susceptible to subtle deformation and deterioration of the surface when subjected to severe use. This deformation and deterioration of the surface is clearly visible, in particular under light incident on the surface from different angles. Visual deterioration is often only partially attributable to actual deterioration of the fibrous elements in the textile floor covering, and the visible deformation and deterioration is simply caused by the slight localized displacement of yarn loops on the surface or by the displacement of individual fibers or filaments within the yarn loops on the surface. These visual surface changes are especially severe with the displacement of filaments within the yarn loops forming the surface. Moreover, the visibility of these surface changes is enhanced when the filament bundles within the yarns forming yarn loops on the surface are bulked, separate from each other, and are occasionally bent down. Visual changes are more pronounced in finer, lower denier yarns, for example, finer low-denier yarns that are formed with low-dpf (denier per filament) fibers or filaments and with fibers or filaments that tend to have lower resilience, for example, polyester fibers, as opposed fibers or filaments that have higher resilience, for example, nylon or polypropylene.

Visual changes on the surface of the textile floor covering are further magnified when the fabric layer of the textile floor covering containing the yarn loops is printed. The printed fabric layer appears to lose resistance to fiber or filament separation at the exposed and dyed tops of the yarn loops. In addition, these tops of the yarn loops tend to deform and flatten, exposing undyed segments of the yarn loops below the tops. After relatively short periods of use, the fibers or filaments in the printed tops of the yarn loops tend to separate more easily than nonprinted yarn loops, which causes the printed fabric layer to change sheen and color tone more readily. Furthermore, refracted light highlights worn areas by showing lighter printed images on the fabric. While printing may or may not cause or promote degradation, printing, as compared to continuously colored "solution dyed" yarns, does magnify the problem of visual changes by exposing more of the base color in a short period of time, thereby shifting the shade of the original print.

One solution to counteract the problem of visual changes uses resins or polymers applied to the surface. These resins or polymers are applied as powders, polymer solutions or resins that are applied and cured. Examples of commercial resins for surface application include a waterborne polyester emulsion, e.g., AR-129 from Hitec Chemicals, and a polyurethane based coating, e.g., Permalock from Polymer Solutions and 40 from Covestro. While application of these resins achieves some improvements, problems persist within the tops of the surface loops as the yarns and their surface loops are relatively bulky from relaxed heating or steaming, which is a common practice in the textile flooring industry. Furthermore, the printing process tends to interfere with the inter-bonding of fibers or filaments at the tops of the yarn loops, which increases loop-tip deterioration and breakage during use. Full impregnation of the bundle of fiber or filaments in the yarns with resin glues the individual filaments together and protects the printed image with a layer of polymer. In theory, the bulked filaments or fibers have larger and more open spaces or voids among the filaments or fibers. These larger spaces when coated after bulking contain fewer bond points between adjacent filaments or fibers after curing takes place.

Applying higher levels of resin to the surface may further improve the performance of printed or nonprinted low-denier and low-dpf (denier per filament) fabrics. However, higher levels of resin detract from the fabric aesthetic, reducing the luster, softness and textile feel of the surface and creating a more plastic feel and a harsher textile hand.

Therefore, a need exists for enabling the use of loop faced fabrics in demanding flooring uses, using yarns of low-denier fabrics formed with low-dpf fibers of any level of resilience, with and without printing, and without substantially hardening the surface.

SUMMARY

Exemplary embodiments are directed to the application of resin to fabrics having looping yarns on the surface of the fabric. In one embodiment, the resin is applied to a greige fabric having a bulkable looped yarn face. The resin is applied before the fabric is bulked and before the formed loops are caused to bloom. The fabric is then bulked, and the resin is set. The fabric may also shrink during the bulking process. The loops are less bulked in the lower strata under the surface, but the apexes of the loops are still open and much more resistant to filament separation, filament breakage, and down-bending. The effect of applying the resin is similar to increasing the effective denier of the yarns and the dpf of the filaments or fibers at the tip or apex of the surface loops. The beneficial effect is very prominent with printed products. The beneficial effect of applying the resins is greater when the entire fabric shrinks in area by 10-20% during the resin setting step and the planarly crowded loops make adhesive contact with each other at the lower strata under the loops. The increased resistance to bending and improved resilience enable the use of finer polyester yarns under 1,000 denier and finer staple fibers or filaments under 6 dpf in flooring applications.

In one embodiment, the resin is applied as a waterborne suspension or a solution. In another embodiment, the resin is a solvent-based solution. In one embodiment the resin in solution or as a suspension is applied on the surface by spraying, by wet roll coat transfer, or by dipping in a pad bath and then nip squeezing to reduce wet pick up. In another embodiment, the level of resin solution or suspension is adjusted using vacuum to extract extra resin.

In one embodiment, the applied resin solution is first dried at a relatively low temperature under 100° C. In one embodiment, radio frequency (RF) heating is used for drying. RF heating dries and removes all the water off the fabric while preventing premature shrinkage of the fabric that is caused by exposure to high temperatures. RF heating heats in a process similar to heating in a microwave by exciting only the water molecules within the fabric containing the applied resin solution. When all the water has evaporated from the fabric and applied resin solution, RF heating has no further heating effect on the fabric.

In one embodiment, the fabric with applied resin solution is dried at temperatures less than 100° C. using forced air and longer exposure times. However, heating with forced air at temperatures below 100° C. is uneconomical and less preferred than RF heating.

After drying, the fabric is bulked. In one embodiment, the fabric is also shrunk in addition to being bulked. In one embodiment, bulking shrinks the fabric surface area by 10% to 30%. Shrinking gathers the loops, tightens the yarn bundles, and increases loop resiliency, which further improves fabric performance. In one embodiment, the fabric is bulked at a much higher temperature over 180° C. Bulking at the much higher temperature simultaneously sets the resin during the bulking process.

Printing is optional. In one embodiment, the fabric is printed after the fabric is coated with the resin and bulked or after the fabric is shrunk and bulked. Printing utilizes temperatures of approximately 200° C., which does not affect the structural integrity of the fabric but will further help to cross link the polymeric resin.

In some embodiments, the fabric is dimensionally stable after being bulked and the resin set. In one embodiment, the bulked fabric is attached to a dimensionally stabilizing backing before printing.

In some embodiments, dimensional stabilizing of the fabric involves embossing, with or without an added backing layer. In other embodiments, the backside of the treated fabric is stabilized by restraining the treated fabric and fusing the backside using a high temperature, followed by contact with a cooled surface, before printing the treated fabric.

Exemplary embodiments are directed to a method for making a textile. A greige fabric having a top surface formed by bulkable yarns that form a plurality of yarn loops covering the entire top surface of the greige fabric is selected. Selecting the greige fabric includes selecting a woven fabric, selecting a stitch-bonded fabric, selecting a knit fabric, and selecting a tufted fabric. In one embodiment, a greige fabric containing bulkable polyester yarn is selected. In one embodiment, a greige fabric having 300 denier to 800 denier bulkable yarn is selected. In one embodiment, a greige fabric containing bulkable yarn with 2 dpf to 8 dpf filaments is selected. In one embodiment, selection of the greige fabric includes forming the greige fabric.

A polymeric resin is applied onto the top surface of the greige fabric. Suitable polymeric resins include a polyester resin, an acrylic resin, and a polyurethane resin. The polymeric resin is applied as a polymeric resin solution, a polymeric resin suspension, a polymeric resin emulsion, a polymeric resin powder, polymeric resin particles, a waterborne polymeric resin containing a polymeric resin dissolved in water, fine particles of polymeric resin dispersed in water without a surfactant, and fine particles of polymeric resin dispersed in water with a surfactant. In one embodiment, the polymeric resin is applied as polymeric resin nanoparticles. Suitable methods for applying the polymeric resin include spraying the polymeric resin, wet-roll transferring the polymeric resin, spreading the polymeric resin, and sifting the polymeric resin. In one embodiment, a wet pick-up of from about 10% to about 60% is achieved.

In one embodiment, the applied polymeric resin is allowed to propagate into the yarns loops from the top surface. In one embodiment, vacuum is applied to the greige fabric containing the applied polymeric resin. In one embodiment, the greige fabric with the applied polymeric resin is heated with heat sufficient to dry the greige fabric with the applied polymeric resin on the top surface without bulking the yarn. In one embodiment, the greige fabric is heated to a temperature less than or equal to 100° C. to dry the greige fabric. In one embodiment, a radio frequency wave treatment is used to heat the greige fabric.

Heat sufficient to bulk the bulkable yarns, to melt the polymeric resin to allow melted polymeric resin to propagate into the yarn loops and among fibers in the bulkable yarns, and to activate the polymeric resin is applied to the greige fabric. In one embodiment, a radio frequency wave treatment is used to heat the greige fabric. In one embodiment, heat sufficient to bulk the bulkable yarns and to shrink the greige fabric in at least one of the machine direction and the cross direction is applied. In one embodiment, heat sufficient to bulk the yarn bulkable yarns and to shrink the greige fabric by about 10% to about 40% in at least one of the machine direction and the cross direction is applied. In one embodiment, heat at a temperature of at least 175° C. is applied to the greige fabric containing the applied polymeric resin. In one embodiment, heat is applied in stages of increasing temperature to the greige fabric containing the applied polymeric resin. In one embodiment, the temperature is increased in stages from 180° C. to 200° C. In one embodiment, the greige fabric is overfeed into an oven while applying heat.

In one embodiment, additional cross-linking is performed in the polymeric resin after applying heat to the greige fabric. In one embodiment, additional cross-linking is achieved by exposing the greige fabric to a temperature of at least 190° C. In one embodiment, the greige fabric is printed. In one embodiment, the greige fabric containing bulked yarn and polymeric resin is stabilized. In one embodiment, the greige fabric is stabilized by attaching a dimensionally stable backing to a bottom surface of the greige fabric opposite the top surface. Suitable dimensionally stable backings include a cushioning felt, a foam layer, a liquid blocking layer, a thermal insulating layer, an antimicrobial layer and combinations thereof. In one embodiment, the greige fabric is stabilized by fusing a bottom surface of the greige fabric opposite the top surface. In one embodiment, the greige fabric is embossed.

Exemplary embodiments are also directed to a method for making a textile b by selecting a greige fabric having a top surface formed by bulkable yarns that form a plurality of yarn loops covering the entire top surface of the greige fabric, applying a polymeric resin onto the top surface of the greige fabric, and applying heat in a plurality of stages of increasing temperature to dry the greige fabric, to bulk the bulkable yarns, to melt the polymeric resin to allow melted polymeric resin to propagate into the yarn loops and among fibers in the bulkable yarns, and to activate the polymeric resin. In one embodiment, the temperature is increased in stages from 100° C. to 200° C.

BRIEF DESCRIPTION OF THE DRAWINGS

The accompanying drawings, which are incorporated in and constitute a part of the specification, illustrate a number of embodiments and, together with the following descriptions, explain these embodiments.

DETAILED DESCRIPTION

The following description of the embodiments refers to the accompanying figures. The same reference numbers in different figures identify the same or similar elements. Reference throughout the whole specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, particular features, structures or characteristics may be combined in any suitable manner in one or more embodiments.

Figure 1:
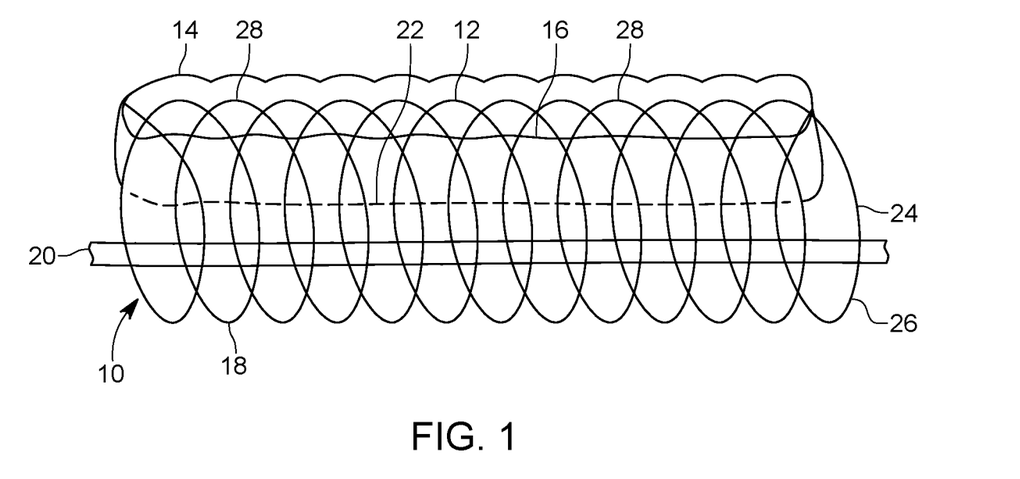
FIG. 1 is a schematic representation of an embodiment of a greige fabric with applied polymeric resin propagated into the greige fabric.

Exemplary embodiments are directed to forming a stable and durable fabric, textile, or textile floorcovering and to the durable fabric, textile or textile floor covering. Referring initially to FIG. 1, desired resin 14, for example, a dissolved or suspended resin is added or applied to a top surface 12 of a greige fabric 10 made from bulkable yarn 26 that forms yarn loops 28 on the exposed top surface. The greige fabric includes a back surface 18 opposite the top surface. As used herein, greige fabric refers to the fabric as formed, for example, stitched, tufted, woven, knit or needle-punched, before finishing the fabric using addition steps such as applying resin, heating, shrinking and bulking. For greige fabrics such as tufted and stitch-bonded fabrics, the greige fabric includes an intermediate layer 20, e.g., a substrate or primary backing, through which the yarns pass. This defines yarn roots 24 at the point each yarn passes through the intermediate layer.

In one embodiment, the applied polymeric resin is allowed to propagate partially into the greige fabric from the top surface to a given depth 16. In one embodiment, the depth of propagation of the applied polymeric resin is controlled by the amount of time provided for propagation. Alternatively, vacuum is applied to the back surface of the greige fabric to draw the applied polymeric resin into the greige fabric. In one embodiment, forced air or vibration is applied to the greige fabric to propagate the applied polymeric resin to the desired given depth.

To remove the solvent or suspension liquid, i.e., to dry the greige fabric and the applied polymeric resin, the greige fabric is heated at a low temperature below the temperature that will bulk the yarn and melt the polymeric resin. For example, the greige fabric is heated to a temperate up to 100° C. (212° F.) or less than 120° C. (248° F.). In one embodiment the fabric is dried using Radio Frequency energy (RF) to allow for low temperature drying.

After drying, the greige fabric is exposed to a higher temperature that is sufficient to bulk the yarn, to melt the polymeric resin and to activate the polymeric resin. Any suitable method for applying heat to the greige fabric as discussed herein can be used. In one embodiment, the greige fabric containing the applied polymeric resin is heated to a temperature of at least 180° C. (356° F.). In one embodiment, the greige fabric containing the applied polymeric resin is heated to a temperature of from about 180° C. to about 200° C. (392° F.). In one embodiment, the greige fabric containing the applied polymeric resin is subjected to heating in stages of increasing temperature through a range of temperatures, e.g., from 180° C. to about 200° C. For example, the greige fabric containing the applied polymeric resin is feed through an oven containing multiple heating zones. The applied heat increases as the greige fabric passes through each zone. In one embodiment, the oven contains four heating zones. Preferably, the greige fabric passes through the oven with overfeeding. This facilitates bulking of the yarns in the greige fabric. Suitable ovens and methods for passing fabrics through the oven with overfeeding are known and available in the art. Increasing the temperature of the greige fabric overtime provides for initial bulking of the greige fabric and melting of the polymeric resin. The melted resin then begins propagated into the yarns and among the yarn fibers. Increasing the temperature initiates activation of the polymeric resins that has propagated into to the yarns and among the fibers. Activation provides cross-linking in the polymeric resin. In one embodiment, the stages for heating the greige fabric includes a stage for drying the greige fabric.

The melted polymeric resin 22 propagates farther into the bulked yarns of the greige fabric towards the yarn roots and commingles with the individual filaments. In one embodiment, the melted polymeric resin propagates completely to the yarn roots or the back surface. In one embodiment, propagation of the melted polymeric resin is aided using vacuum, forced air or vibration. In one embodiment, the greige fabric, during heating at the higher temperature to bulk the yarns is also shrunk in one or more directions across the greige fabric. Therefore, the surface area of the greige fabric is shrunk or decreased.

Figure 2:
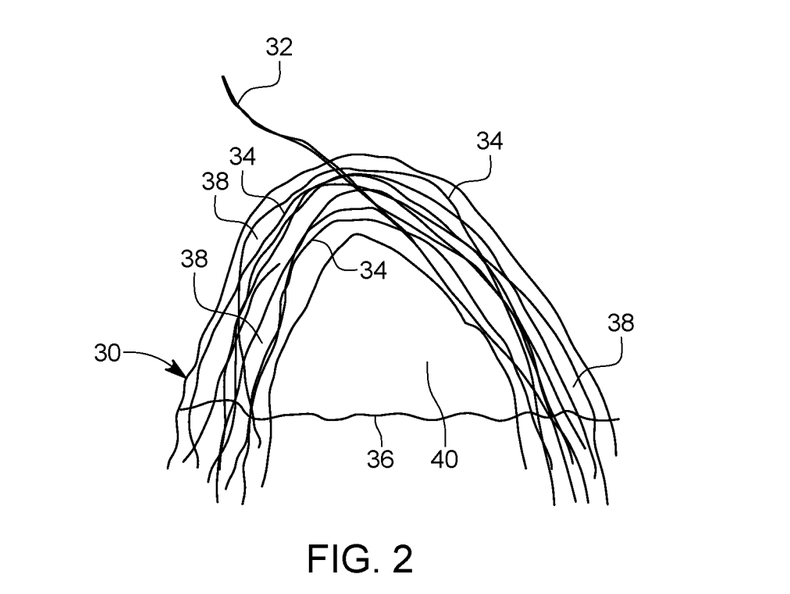
FIG. 2 is a schematic representation of an embodiment of a bulkable yarn with melted polymeric resin propagated among the yarn filaments.

Referring to FIG. 2, a given bulkable yarn 30 or bulkable yarn loop within the greige fabric contains a plurality of individual filaments 34 or fibers. Upon bulking of the greige fabric, the yarns bloom and the individual filaments separate. This allows the melted polymeric resin 36 while propagating into the greige fabric and filling voids 40 among the yarn loops to also fill voids or spaces 38 among the individual filaments created by the bulking or shrinking process. The melted polymeric resin forms mechanical bonds with the individual filaments, stabilizing the individual filaments within each yarn. In one embodiment, the individual filaments are stabilized down to the yarn roots or back surface of the bulked greige fabric. Stabilization prevents relative movement among the individual filaments during use of the now stabilized bulked greige fabric. Prevention of relative movement prevents wear and damage to the individual filaments that can result in broken or stray filaments 32 extending out of the yarns and top surface of the now bulked greige fabric.

In one embodiment, additional cross-linking is achieved in the polymeric resin after applying heat to the greige fabric. Additional cross-linking is achieved by exposing the bulked greige fabric to a temperature of at least 190° C. (374° F.). In one embodiment, the bulked greige fabric is exposed to heat from about 190° C. to about 205° C. (380° F. to 400° F.). Additional cross-linking further stabilizes the yarns and individual fiber filaments in the yarns. Additional cross-linking can be conducted as a stand a separate step. For example, the bulked greige fabric is cooled. Later, the cooled bulked greige fabric is reheated to initiate additional cross-linking. Alternatively, additional cross-linking occurs simultaneously with another subsequent processing step, e.g., embossing or printing the bulked greige fabric.

In one embodiment, the bulked greige fabric containing the propagated and activated polymeric resin is then subject to a desired sequence of optional processing steps. In one embodiment, the bulked fabric with the polymeric resin is printed. If desired, this printed bulked greige fabric is embossed. In one embodiment, the bulked fabric with the polymeric resin is stabilized, for example, by treating the back surface of the bulked fabric with heat, pressure, or additional resin. The stabilized bulked greige fabric is printed, and, if desired, the printed fabric is embossed. In one embodiment, a stabilizing backing is attached to the back surface of the bulked fabric containing the polymeric resin. The resulting composite is printed, and, if desired, the printed composite is embossed. Alternatively, the composite is embossed without printing. In one embodiment, the bulked fabric containing the polymeric resin is directly embossed first, and the embossed fabric is then printed.

Figure 3:
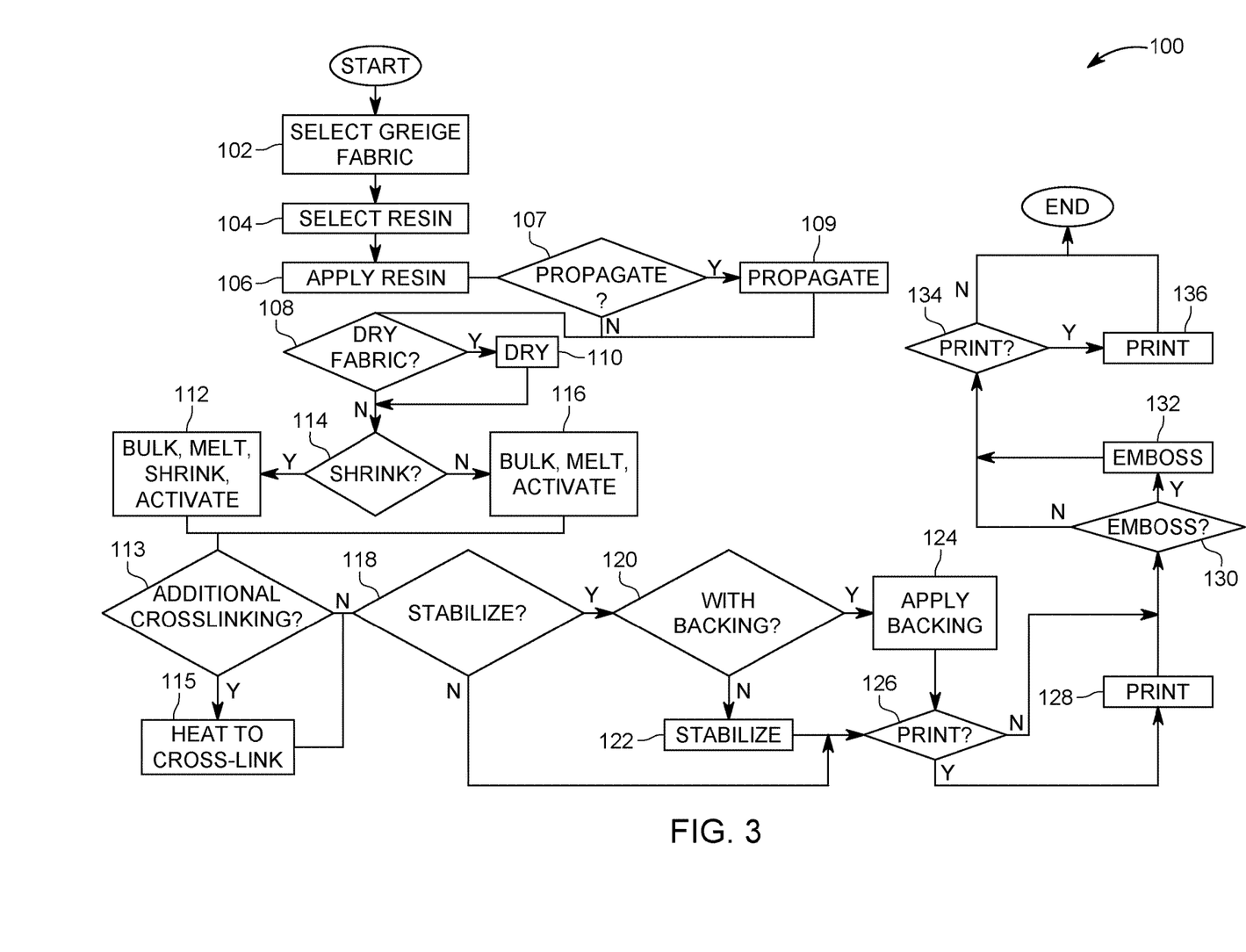
FIG. 3 is a flow chart illustrating an embodiment of forming a stable and durable textile.

Referring now to FIG. 3, an exemplary embodiment of a method for making a textile 100 is illustrated. Initially, the desired greige fabric is selected 102. The greige fabric contains bulkable yarn containing a plurality of individual fibers and forming a plurality of yarn loops on a top surface of the greige fabric. Therefore, the greige fabric is a loop-faced fabric. Suitable greige fabrics include, but are not limited to, a woven fabric, a stitch-bonded fabric, a knit fabric, and a tufted fabric. In one embodiment, selecting the greige fabric includes forming the greige fabric. Any suitable method for forming or making the desired greige fabric, e.g., knitting, stitch-bonding, weaving and tufting, known and available in the art can be used. In one embodiment, the greige fabric contains bulkable polyester yarn. Suitable greige fabrics have from 300 denier to 800 denier bulkable yarn. The yarn includes fibers or filaments, collectively herein filaments, and suitable greige fabrics include yarn having from 2 dpf to 8 dpf filaments.

The resin to be applied to the greige fabric is then selected 104. Suitable resins include, but are not limited to, polymeric resins, for example polyester resins, polyurethane resins, copolyester resins, polyethylene resins and acrylic resins. In addition to selecting the chemical composition of the resin, the form of the resin is also selected. Alternatively, the selected resin is prepared in the desired form. Suitable forms for the resin include, but are not limited to, particles, nanoparticles, powders, suspensions, solutions and emulsions. Suitable solvents for the solution and liquids for the suspensions and emulsions include water. Examples of preparations of polymeric resins for application to the greige fabric include a polymeric resin solution, a polymeric resin suspension, a polymeric resin emulsion, a polymeric resin powder, polymeric resin particles, polymeric resin nanoparticles, a waterborne polymeric resin of a polymeric resin dissolved in water, fine particles of polymeric resin dispersed in water without a surfactant, and fine particles of polymeric resin dispersed in water with a surfactant.

In one embodiment, polymers suitable for application to the top surface of the greige loop-faced fabric are suspended in an emulsion such as a water-based emulsion. For example, nano particles of polymer are used in a water-based emulsion. The polymers can be applied, for example, as powders or polymer solutions. Suitable polymers resins also include a waterborne polyester emulsion, for example AR-129 commercially available from Hitec Chemicals, and polyurethane based coatings, for example, Permalock, commercially available from Polymer Solutions, and 40, commercially available from Covestro.

Having selected the resin and the form in which the resin is to be applied, the resin in the desired preparation is applied to the top surface of the greige fabric 106. Suitable methods for applying the resin include, but are not limited to, spraying the polymeric resin, wet-roll transferring the polymeric resin, spreading the polymeric resin, foaming the resin, and sifting the polymeric resin. In one embodiment, the resin solution, suspension or emulsion is padded on the top surface of the greige fabric. In one embodiment, padding of the greige fabric is followed by squeezing the greige fabric, for example, between two nip rollers. Typical wet pick up by the greige fabric is approximately 65% after exiting a pad and exposure to high-pressure squeeze using nip rollers. In one embodiment, the wet greige fabric is also subjected to vacuum extraction, reducing wet pick up to 20 to 30%. In one embodiment, applying the polymeric resin comprises achieves a wet pick-up in the greige fabric of from about 10% to about 60%.

Having applied the resin to the greige fabric, a determination is made regarding whether the applied polymeric resin will be allowed to propagate into the greige fabric 107. If propagation is to be allowed, then the applied polymeric resin propagates into the greige fabric from the top surface 109. In one embodiment, propagation includes waiting a predetermined period of time, applying vacuum to the greige fabric, directing forced air onto the greige fabric, vibrating the greige fabric and combinations thereof.

Following propagation of the applied polymeric resin or if the applied polymeric resin is not to be propagated, a determination is made regarding whether the greige fabric and applied resin needs to be dried 108. For example, drying may not be required for resins applied as powders or particles. In addition, squeezing the greige fabric may remove a sufficient amount of moisture from the greige fabric. If the greige fabric is to be dried, then the greige fabric is dried 110. In one embodiment, the greige fabric containing the applied polymeric resin is heated with heat sufficient to dry the greige fabric containing the applied polymeric resin without bulking the yarn and curing the resin. Therefore, the temperature used to dry is below the bulking temperature of the yarn in the greige fabric. In one embodiment, a low temperature of less than or equal to 100° C. is applied to the greige fabric containing the applied polymeric resin. In one embodiment, a low temperature of less than or equal to 120° C. is applied to the greige fabric containing the applied polymeric resin. In one embodiment, a low temperature of less than or equal to 150° C. is applied to the greige fabric containing the applied polymeric resin. Suitable methods for heating the greige fabric include, but are not limited to, conduction heating, convection heating and induction heating. In one embodiment, hot air is directed onto the greige fabric. In one embodiment, a radio frequency (RF) wave treatment is used to heat the greige fabric. In one embodiment, RF waves are used to dry the fabric containing the resin in a solution, suspension or emulsion such that the RF waves do not raise the temperature in the system above 100° C. In one embodiment, vacuum extraction is also applied to the greige fabric containing the applied polymeric resin to remove liquids and moisture.

Having dried the greige fabric containing the polymeric resin or if drying is not required, the yarn in the greige fabric is bulked, while the applied polymeric resin is melted and activated. In addition to bulking, melting and activating, the greige fabric can be shrunk in at least one direction across the greige fabric. Therefore, a determination is made regarding whether the greige fabric containing the polymeric resin is to be shrunk 114. If not, heat is applied to the greige fabric containing the applied polymeric resin to bulk the yarn, and to melt to activate the applied polymeric resin 116. The applied heat is sufficient to bulk the yarn and melt, the applied resin. In one embodiment, a high temperature greater than or equal to 180° C. is applied to the greige fabric containing the applied polymeric resin. In one embodiment, a high temperature from about 180° C. to about 200° C. is applied to the greige fabric containing the applied polymeric resin. Suitable methods and equipment for applying the high temperature are the same as those used to apply the low temperature.

In one embodiment, the greige fabric containing the applied polymeric resin is heated in a plurality of stages of increasing temperature. In one embodiment, these stages span a range of temperatures, e.g., from 180° C. to about 200° C. In one embodiment, these stages include a stage for drying the greige fabric, e.g., a stage of heating up to around 100° C. For example, the greige fabric containing the applied polymeric resin is feed through an oven containing multiple heating zones. The applied heat increases as the greige fabric passes through each zone. In one embodiment, the oven contains four heating zones. Preferably, the greige fabric passes through the oven with overfeeding. This facilitates bulking of the yarns in the greige fabric. Suitable ovens and methods for passing fabrics through the oven with overfeeding are known and available in the art. Increasing the temperature of the greige fabric overtime provides for initial bulking of the greige fabric and melting of the polymeric resin. The melted resin then begins propagated into the yarns and among the yarn fibers. Increasing the temperature initiates activation of the polymeric resins that has propagated into to the yarns and among the fibers. Activation provides cross-linking in the polymeric resin. In one embodiment, the bulked greige fabric containing the cross-linked polymeric resins that has propagated into the yarns and among the yarn fibers is cooled. Suitable methods for cooling the greige fabric are known and available in the art and include blowing air over the bulked greige fabric.

If the greige fabric containing the applied resin is to be shrunk, heat sufficient to bulk the yarn, to melt and activate the applied polymeric resin and to shrink the greige fabric is applied to the greige fabric 112. The greige fabric is shrunk in at least one direction across the fabric, decreasing the surface area of the greige fabric. In one embodiment, the greige fabric is shrunk in at least one of the machine direction and the cross direction. In one embodiment, heat sufficient to shrink the greige fabric by about 10% to about 40% in at least one of the machine direction and the cross direction is applied to the greige fabric. The greige fabric can be shrunk by the same amount in each direction or by a different amount in each direction.

Heating of the greige fabric, either with shrinking or without shrinking, can be conducted with the greige fabric under restraint in one or more directions across the greige fabric or without restraint. In one embodiment, restraint is applied by the greige fabric using clip or pin tenter frames to hold the cross direction at a selected width. In one embodiment, the greige fabric is restrained in the machine direction by overfeeding the greige fabric to only a predetermined amount and no more. In one embodiment, the greige fabric is allowed to ride freely on a belt with overfeed and to shrink with no restraint in the cross direction. Retraining the material decreases the variability inherent in bulking and shrinking the greige fabric, resulting in a more precise and uniform and uniform fabric.

The melted polymeric resin is allowed to propagate through the greige fabric and bulked yarns from the top surface toward the yarn roots or back surface. In one embodiment, the melted resin propagates completely through the greige fabric to the yarn roots or back surface. In one embodiment, propagation includes waiting a predetermined period of time, applying vacuum to the greige fabric, directing forced air onto the greige fabric, vibrating the greige fabric and combinations thereof. The propagated melted resin also passes among the individual fibers or filaments of the yarns.

Having propagated the melted resin through the bulked yarns, a determination is made regarding whether or not to provide additional cross-linking in the polymeric resin 113. If the additional cross-linking is desired, sufficient heat is applied to the greige fabric to activate the resin 115. In one embodiment, heat is applied from about 175° C. to about 205° C. In one embodiment, heat is applied at least 190° C. In one embodiment, heat is applied at about 193° C. to about 205° C.

The resulting bulked, and optionally shrunk, greige fabric containing the activate polymeric resin has a top surface that is significantly more resistant to surface deformation, abrasion and wear compared to the similarly bulked, and shrunk, fabrics either with or without resin that are made using other processes. Having achieved the desired Bulked greige fabric with improve stability and wear characteristics, that bulked greige fabric can be further exposed to one or more additional processing steps to achieve the desired finished textile. In one embodiment, the finished textile is combined with other layers or components to form a composite textile product. In one embodiment, further processing is applied, and the bulked, cured, and optionally shrunk greige fabric is the finished textile.

For additional processing, a determination is made regarding whether the greige fabric containing bulked yarn and cured polymeric resin is to be stabilized 118. If the greige fabric is to be stabilized, then a determination is made regarding whether the greige fabric is to be stabilized using an applied backing 120. If the greige fabric is to be stabilized using an applied backing, a dimensionally stable backing is applied to a bottom surface of the greige fabric opposite the top surface 124. Suitable dimensionally stable backings include, but are not limited to, woven scrims and nonwoven scrims containing stable fibers including fiberglass and polyester. In addition to stabilizing the greige fabric, the dimensionally stable backing can also add cushion, for example, in the case of a felt or foam layer, and combinations of other secondary properties including liquid blocking, thermal insulation and antimicrobial properties. In one embodiment, the dimensionally stable backing is a cushioning felt, a foam layer, a liquid blocking layer, a thermal insulating layer, an antimicrobial layer and combinations thereof.

Figure 4:
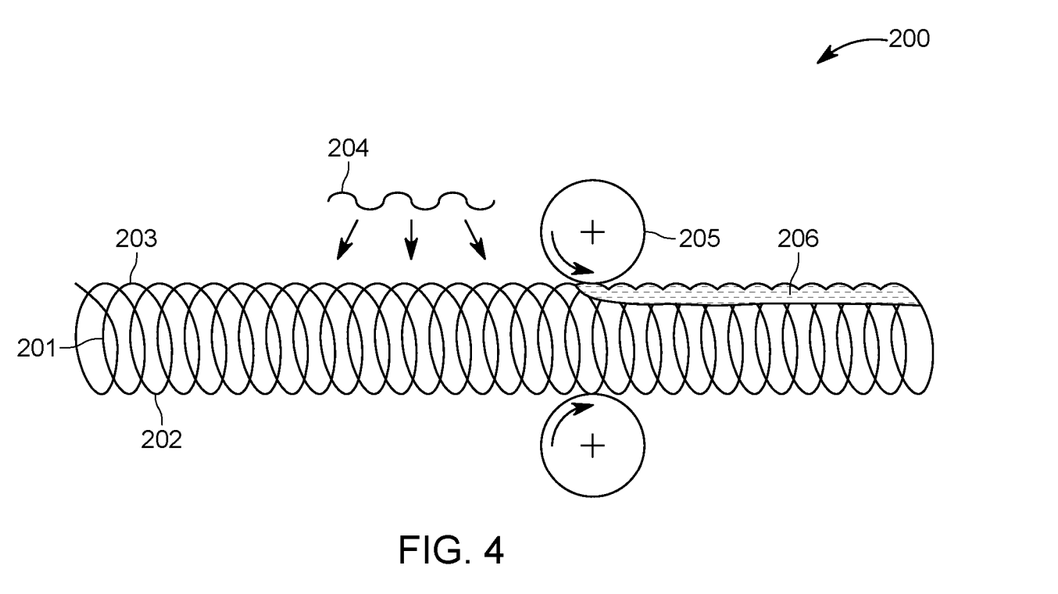
FIG. 4 is a schematic representation of an embodiment of using heat and cooling under low pressure to stabilize the bottom surface of a fabric having a looped yarn face.

If the greige fabric is to be stabilized without adding a backing, the bottom surface of the greige fabric is stabilized 122. In one embodiment, the bottom surface of the greige fabric fused. In one embodiment, the bottom surface is fused by treating the bottom surface with heat and low pressure to create a fused and stable back. Any suitable method for applying heat as discussed herein can be used to apply heat to the bottom surface. Referring now to FIG. 4, an exemplary process for heating the bottom surface of a greige fabric containing yarn loops on a top surface 200 is illustrated. The greige fabric 201 as disclosed herein and containing yarn forming yarn loops on the top surface 202 has the bottom surface 203 exposed to a heating source 204 source. Suitable heating sources include, but are not limited to, radiant, conductive, convective and RF heating sources. In one embodiment, the bottom surface is exposed to hot air. The applied heat softens and melts the bottom surface, and the greige fabric with the melted bottom surface is passed between a pair of rollers 205. The rollers are set to lightly touch the greige fabric, and at least the roller in contact with the bottom surface is a cooled roller. Suitable rollers have a smooth surface or a textured surface. Lightly touching the bottom surface with a cooled roller produces a fused and stabilized face 206 on the bottom surface. In one embodiment, the greige fabric is held under area restraint during heating to not allow movement of the greige fabric in either the machine direction (MD), the cross direction (XD) or both the MD and the XD. In one embodiment, a pin or clip tenter frame is used to restrain the greige fabric. A pin or clip tenter frame includes pin or clips to hold the sides or edges of the greige fabric and to control the width (XD) and length (MD). In addition, the heated bottom surface is contacted by the cooled roller while the greige fabric is held under restraint.

Returning to FIG. 3, a determination is then made regarding whether the greige fabric, without stabilizing, stabilized with a backing or stabilized without a backing is to be printed 126. If the greige fabric is to be printed, then at least the top surface of the greige fabric is printed 128. In one embodiment, the bulked and cured greige fabric is directly printed when the greige fabric is sufficiently stable to avoid distortion. Suitable printing processes include printing process that involve heating that does not exceed the bulking temperature of the yarn in the greige fabric. These printing processes include, but are not limited to, transfer-printing, sublimation printing, and screen printing. Both direct printing to white fabric using either low, medium or high energy disperse dye inks and transfer printing using low energy disperse dye inks sublimated from transfer paper are used for printing polyester fabrics. For direct printing, the greige fabric is dried and re-set afterwards. In one embodiment, sublimation printing onto polyester fabrics is performed by calendering.

A determination is then made whether to emboss the greige fabric containing the bulk yarn and the resin 130. This greige fabric can be shrunk, stabilized on the bottom surface with a backing, stabilized on the bottom surface without a backing, printed or various combinations thereof. If the greige fabric is to be embossed, the greige fabric is embossed 132, for example, with heating. In one embodiment, embossing is performed with a heated three-dimensionally patterned plate. In one embodiment, embossing is performed by roll pressing the greige fabric against a hard surface, a solid surface, or a compressible elastic surface such as silicon rubber.

Figure 5:
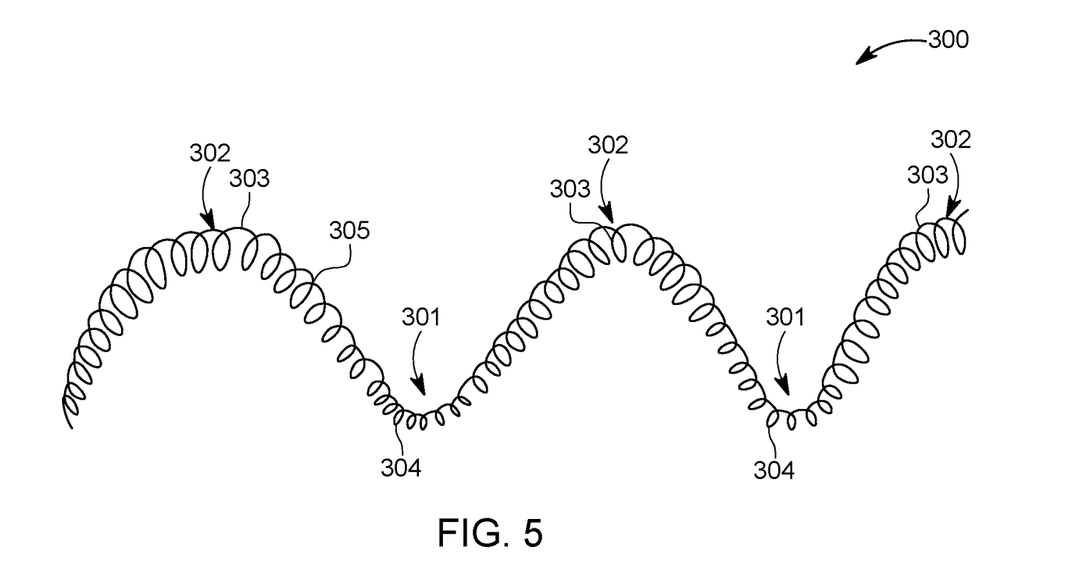
FIG. 5 is a schematic representation of a cross section of an embodiment of a fabric embossed with a deep pattern showing depressed and highly consolidated areas and exposed elevated areas.

Referring to FIG. 5, an embodiment of an embossed greige fabric 300 containing yarn forming yarn loops on the top surface 305 is illustrated. After embossing, the greige fabric has compacted depressed areas 301 and non-compacted elevated areas 302. The embossing temperature does not exceed the bulking temperature of the fabric, and the bulked and heat-set yarn loops 303 in the elevated areas 302 of the three-dimensional pattern are not compressed or deformed, largely maintaining their shape, structure and relationship to each other. Therefore, the yarn loops and the loop faced fabric in the elevated areas remain essentially unchanged and maintain their durability provided by bulking the yarns and curing the resin. The depressed areas 301 are crushed by the pressure of the embossing roll texture, and loops 304 in the depressed areas are deformed and compacted. When the treated fabric is embossed, the improved bonds at these elevated tips, which are not consolidated or minimally consolidated by the embossing process, continue to exhibit high performance characteristics.

When a greige looped flooring fabric is not treated with resin or is treated with resin after being bulked and then printed and subsequently embossed, the exposed areas at the elevated tips of the loops roll and twist under forces applied by traffic passing over the surface of the fabric. This rolling and twisting of loops results in bent and broken filaments. When the fabric is printed, this bending and breaking of filaments progresses gradually deeper within the dyed strata. Eventually, the base color of the filament and yarn that is not colored to an unacceptable degree by the applied dye is exposed, and exposure of the base color causes color patterns in the fabric to shift. Coating the greige fabric with resin before bulking minimizes voids among the resin bonds within the yarn loops and among the yarn filaments. In addition, coating the greige fabric with resin before bulking increases resistance to the rolling and twisting under the forces applied by traffic within the elevated and exposed low-consolidation areas in an embossed loopy-faced fabric.

Returning to FIG. 3, having embossed the greige fabric or if the greige fabric has not been embossed, a second determination is made regarding whether to print the greige fabric 134. If the greige fabric is to be printed, then at least the top surface of the greige fabric is printed 136. In one embodiment, the bulked and cured greige fabric is directly printed when the greige fabric is sufficiently stable to avoid distortion. Suitable printing processes include printing process that involve heating that does not exceed the bulking temperature of the yarn in the greige fabric. These printing processes include, but are not limited to, transfer-printing, sublimation printing, and screen printing. Both direct printing to white fabric using either low, medium or high energy disperse dye inks and transfer printing using low energy disperse dye inks sublimated from transfer paper are used for printing polyester fabrics. For direct printing, the greige fabric is dried and re-set afterwards. In one embodiment, sublimation printing onto polyester fabrics is performed by calendering. For direct printing the fabric is dried and re-set afterwards. Sublimation onto polyester fabrics is usually performed by calendering. Embossed fabrics can be transfer-printed by sublimation from preprinted paper with relatively limited dye penetration. Samples produced by direct printing on to the embossed and completed textile produce better dye penetration.

EXAMPLES

A first example of a greige fabric was formed as a fabric bulked and textured and then stabilized with no resin treatment. A stitchbonded looped fabric was prepared by stitching 600 total denier and 5 dpf textured polyester yarns into a polyethylene substrate, forming a greige 11.5 oz/yd$^2$ fabric. The fabric had yarn loops covering both surfaces. The prepared fabric was shrunk by approximately 20% in the machine direction and 3% in the cross-machine direction by subjecting the fabric to 180° C. Heating also bulked the fabric, causing the loops on the surfaces to rise and bloom open and raising the weight of the fabric from 11.5 oz/yd$^2$ to 14 oz/yd$^2$. The bulked fabric was then stabilized with a backing layer and subjected to a BYK Testing Apparatus to determine surface loop durability. The number of applied cycles was increased until the surface appearance changed distinguishably when compared to the untested areas. Perceptible change occurred at approximately 50-100 BYK Gradner Scrub test cycles.

In a second example, a fabric was first bulked and then resin coated, stabilized and textured. The stitchbonded and bulked fabric described in the first example was sprayed with a solution of 50% Permaloc in water, resulting in a wet pick-up of approximately 25%. The fabric was subjected to 180° C., which caused the solution to set, resulting in a final weight of 14 oz/yd$^2$. The bulked and coated fabric was then stabilized with a backing layer. The fabric was not subjected to additional bulking. The surface harshness was higher than the fabric of the first example. When subjected to the BYK Test, the fabric withstood approximately 150 BYK Gradner Scrub Test cycles before showing perceptible change from the untested areas of the top surface.

In a third example, also as per prior art, the fabric was bulked, embossed, stabilized and then resin-treated. The stitchbonded and bulked fabric of the first example was embossed with a 3D pattern and attached to a stabilizing backing. The composite was then sprayed with the same amount of resin as in the second example and heat-treated at 180° C. to cure the resin. The fabric surface was considerably harsh with a fogging effect on color. The resulting fabric can withstand 150 to 300 BYK Gradner Scrub Test cycles before showing a surface change beyond the initial fogging effect.

In a fourth example, prepared according to the methods disclosed herein, a greige fabric was resin treated and then bulked. The greige fabric was sprayed with the same amount of resin as in second and third examples. The greige fabric was then subjected to drying at 100° C. without any change in dimension and no bulking of the surface yarns. After drying, the fabric was then subjected to 180° C., which caused the fabric to shrink, for example, to the same degree as in the first, second and third examples. In addition, the yarn loops were bulked, causing the surface loops to rise up, and the applied resin was set. The bulking at the top was approximately the same as in the first example with the base of the loops slightly tighter. The surface feel was softer than the fabric of either the second example or the third example and slightly stiffer than the fabric of the first example. The stabilized fabric withstood 300 to 500 BYK Gradner Scrub Test cycles without a perceptible surface change.

Exemplary embodiments are also directed to a textile containing a bulked greige fabric stabilized with a resin such as a polymeric resin and to textiles made in accordance with the methods disclosed herein.

The foregoing written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for making a textile, the method comprising:
    selecting a greige fabric comprising a top surface formed by bulkable yarns forming a plurality of yarn loops covering an entire top surface of the greige fabric, wherein the bulkable yarns are bulkable by application of heat;
    applying a polymeric resin onto the top surface of the greige fabric to form a processed fabric;
    allowing the applied polymeric resin to propagate into the processed fabric from the top surface; and
    applying, to the processed fabric with the polymeric resin propagated into the greige fabric, heat sufficient to first bulk the bulkable yarns so that the bulkable yarns bloom and individual filaments of the bulkable yarns separate and melt the polymeric resin to allow melted polymeric resin to propagate into the yarn loops and among fibers in the bulkable yarns, and then to activate the melted polymeric resin propagated into the yarn loops and among the fibers in the bulkable yarns.

2. The method of claim 1, wherein selecting the greige fabric comprises selecting a woven fabric, selecting a stitchbonded fabric, selecting a knit fabric, or selecting a tufted fabric.

3. The method of claim 1, wherein the method further comprises applying vacuum to the processed fabric containing the applied polymeric resin.

4. The method of claim 1, wherein selecting the greige fabric comprises selecting a greige fabric comprising bulkable polyester yarn.

5. The method of claim 1, wherein selecting the greige fabric comprises selecting a greige fabric comprising 300 denier to 800 denier bulkable yarn.

6. The method of claim 1, wherein selecting the greige fabric comprises selecting a greige fabric comprising bulkable yarn comprising 2 dpf to 8 dpf filaments.

7. The method of claim 1, wherein selecting the greige fabric comprises forming the greige fabric.

8. The method of claim 1, wherein applying the polymeric resin comprises applying a polyester resin, applying an acrylic resin, or applying a polyurethane resin.

9. The method of claim 1, wherein applying the polymeric resin comprises applying a polymeric resin solution, applying a polymeric resin suspension, applying a polymeric resin emulsion, applying a polymeric resin powder, applying polymeric resin particles, applying a waterborne polymeric resin comprising a polymeric resin dissolved in water, applying fine particles of polymeric resin dispersed in water without a surfactant, or applying fine particles of polymeric resin dispersed in water with a surfactant.

10. The method of claim 1, wherein applying the polymeric resin comprises applying polymeric resin nanoparticles.

11. The method of claim 1, wherein applying the polymeric resin comprises spraying the polymeric resin, wet-roll transferring the polymeric resin, spreading the polymeric resin, or sifting the polymeric resin.

12. The method of claim 1, wherein applying the polymeric resin comprises achieving a wet pick-up of from about 10% to about 60%.

13. The method of claim 1, wherein applying heat to the processed fabric further comprises applying heat sufficient to bulk the bulkable yarns and to shrink the processed fabric in at least one of the machine direction and the cross direction.

14. The method of claim 13, wherein applying heat sufficient to bulk the yarn bulkable yarns and to shrink the processed fabric by about 10% to about 40% in at least one of the machine direction and the cross direction.

15. The method of claim 1, wherein the method further comprises heating the processed fabric with the applied polymeric resin with heat sufficient to dry the processed fabric with the applied polymeric resin on the top surface without bulking the yarn.

16. The method of claim 15, wherein heating the processed fabric with the applied polymeric resin with heat sufficient to dry the processed fabric comprises heating the processed fabric to a temperature less than or equal to 100° C.

17. The method of claim 1, wherein applying heat to the processed fabric comprises applying heat at a temperature of at least 175° C. to the processed fabric containing the applied polymeric resin.

18. The method of claim 1, applying heat to the processed fabric comprises applying heat in stages of increasing temperature to the processed fabric containing the applied polymeric resin.

19. The method of claim 18, wherein applying heat in stages of increasing temperatures comprises increasing the temperature in stages from 180° C. to 200° C.

20. The method of claim 1, wherein applying heat to the processed fabric further comprises overfeeding the processed fabric into an oven while applying heat.

21. The method of claim 1, wherein the method further comprises performing additional cross-linking in the polymeric resin after applying heat to the processed fabric.

22. The method of claim 21, wherein performing additional cross-linking comprises exposing the processed fabric to a temperature of at least 190° C.

23. The method of claim 1, wherein heating the processed fabric with the applied polymeric resin comprises using a radio frequency wave treatment to heat the greige fabric.

24. The method of claim 1, wherein the method further comprises printing the processed fabric.

25. The method of claim 1, wherein the method further comprises stabilizing the processed fabric comprising bulked yarn and polymeric resin.

26. The method of claim 25, wherein stabilizing the processed fabric comprises attaching a dimensionally stable backing to a bottom surface of the processed fabric opposite the top surface.

27. The method of claim 26, wherein the dimensionally stable backing comprises a cushioning felt, a foam layer, a liquid blocking layer, a thermal insulating layer, an antimicrobial layer or combinations thereof.

28. The method of claim 26, wherein stabilizing the processed fabric comprises fusing a bottom surface of the greige fabric opposite the top surface.

29. The method of claim 1, wherein the method further comprises embossing the processed fabric.

30. A method for making a textile, the method comprising:
   selecting a greige fabric comprising a top surface formed by bulkable yarns forming a plurality of yarn loops covering an entire top surface of the greige fabric, wherein the bulkable yarns are bulkable by application of heat;
   applying a polymeric resin onto the top surface of the greige fabric to form a processed fabric;
   allowing applied polymeric resin to propagate into the greige fabric from the top surface; and
   feeding the processed fabric with the polymeric resin propagated into the processed fabric, into an oven having a plurality of stages of increasing temperature so that the processed fabric is first dried, then the bulkable yarns are bulked so that the bulkable yarns bloom and individual filaments of the bulkable yarns separate and the polymeric resin is melted and allowed to propagate into the yarn loops and among fibers in the bulkable yarns, and then the melted polymeric resin propagated into the yarn loops and among the fibers in the bulkable yarns is activated.

31. The method of claim 30, wherein applying heat in stages of increasing temperatures comprises increasing the temperature in stages from 100° C. to 200° C.

* * * * *